US007949604B2

(12) United States Patent
Asazu et al.

(10) Patent No.: US 7,949,604 B2
(45) Date of Patent: May 24, 2011

(54) INFORMATION PROVIDING SYSTEM, AND INFORMATION PROCESSING APPARATUS AND METHOD

(75) Inventors: Hideki Asazu, Tokyo (JP); Tomoyuki Yamamoto, Kanagawa (JP); Katsuro Matsuzaki, Kanagawa (JP); Kensuke Ohnuma, Tokyo (JP)

(73) Assignee: Sony Corporation (JP)

( * ) Notice: Subject to any disclaimer, the term of this patent is extended or adjusted under 35 U.S.C. 154(b) by 1474 days.

(21) Appl. No.: 10/481,846

(22) PCT Filed: Jun. 26, 2002

(86) PCT No.: PCT/JP02/06387
§ 371 (c)(1),
(2), (4) Date: Jun. 23, 2004

(87) PCT Pub. No.: WO03/003739
PCT Pub. Date: Jan. 9, 2003

(65) Prior Publication Data
US 2004/0249966 A1 Dec. 9, 2004

(30) Foreign Application Priority Data

Jun. 28, 2001 (JP) ................................. 2001-195789

(51) Int. Cl.
*G06F 21/00* (2006.01)
(52) U.S. Cl. ............ 705/51; 705/52; 705/904; 705/908; 705/911; 709/217; 709/231; 380/201; 713/176; 725/1; 725/8; 726/26; 726/31
(58) Field of Classification Search .................. 709/204, 709/231, 217; 713/176, 155, 156; 705/51, 705/52, 55, 904, 908, 911; 380/200, 201; 726/26, 31
See application file for complete search history.

(56) References Cited

U.S. PATENT DOCUMENTS 5,974,140 A * 10/1999 Tanaka ............................ 705/52
(Continued)

FOREIGN PATENT DOCUMENTS

EP 0863453 A1 9/1998
(Continued)

OTHER PUBLICATIONS

European Search Report, EP 02741316, dated Mar. 8, 2010.

*Primary Examiner* — Nasser Moazzami
*Assistant Examiner* — Shanto M Abedin
(74) *Attorney, Agent, or Firm* — Lerner, David, Littenberg, Krumholz & Mentlik, LLP

(57) ABSTRACT

This invention relates to an information providing system which is designed to be able to realize secondary utilization of broadcasting contents, along with copyright of the broadcasting contents being protected. A broadcasting receiving and picture recording device 5-1 records broadcasting contents that a broadcasting device 4 broadcasted, and a terminal 6-1 edits the broadcasting contents which were recorded, and generates corresponding metadata. The metadata is transmitted from the terminal 6-1 to a metadata delivery server 2 through Internet 1, and registered. The metadata delivery server 2, on the basis of utilization availability information of broadcasting contents which is held in advance, in case that the broadcasting content that the metadata targets can be utilized, registers the metadata. The registered metadata is delivered through the Internet 1 on the basis of a request of a terminal 6-2. This invention is applied to an information providing system which delivers the metadata.

7 Claims, 13 Drawing Sheets

U.S. PATENT DOCUMENTS

| | | | |
|---|---|---|---|
| 6,035,304 A | 3/2000 | Machida et al. | |
| 6,240,138 B1 * | 5/2001 | Koishikawa et al. | 375/240.28 |
| 6,463,539 B1 * | 10/2002 | Mochizuki | 713/193 |
| 6,587,837 B1 * | 7/2003 | Spagna et al. | 705/26 |
| 6,802,011 B1 * | 10/2004 | Ogino | 726/32 |
| 6,907,407 B1 * | 6/2005 | Yamanoue et al. | 705/57 |
| 6,959,288 B1 * | 10/2005 | Medina et al. | 705/51 |
| 6,978,377 B1 * | 12/2005 | Asano et al. | 713/193 |
| 6,983,371 B1 * | 1/2006 | Hurtado et al. | 713/189 |
| 7,003,664 B2 * | 2/2006 | Kori | 713/165 |
| 7,073,073 B1 * | 7/2006 | Nonaka et al. | 713/193 |
| 7,099,846 B1 * | 8/2006 | Ishibashi et al. | 705/51 |
| 7,227,971 B2 * | 6/2007 | Nagao | 382/100 |
| 7,240,033 B2 * | 7/2007 | Kuriya et al. | 705/51 |
| 7,266,202 B1 * | 9/2007 | Kawakami et al. | 380/283 |
| 7,274,859 B2 * | 9/2007 | Ohnuma | 386/95 |
| 7,287,010 B1 * | 10/2007 | Ishibashi | 705/52 |
| 7,353,540 B2 * | 4/2008 | Kishi et al. | 726/26 |
| 7,353,541 B1 * | 4/2008 | Ishibashi et al. | 726/26 |
| 7,650,646 B2 * | 1/2010 | Asano et al. | 726/32 |
| 7,778,925 B2 * | 8/2010 | Siegel et al. | 705/50 |
| 2002/0106192 A1 * | 8/2002 | Sako | 386/94 |
| 2002/0116459 A1 * | 8/2002 | Zuberec et al. | 709/204 |
| 2002/0159594 A1 * | 10/2002 | Kori | 380/203 |
| 2004/0015984 A1 * | 1/2004 | Yamamoto et al. | 725/28 |
| 2004/0078336 A1 * | 4/2004 | Asadu | 705/51 |
| 2004/0179691 A1 * | 9/2004 | Hori et al. | 380/277 |
| 2004/0213552 A1 * | 10/2004 | Kato | 386/69 |

FOREIGN PATENT DOCUMENTS

| | | |
|---|---|---|
| EP | 0927921 A2 | 7/1999 |
| EP | 1067469 A2 * | 1/2001 |
| JP | 10-13811 A1 | 1/1998 |
| JP | 2000-132522 A1 | 5/2000 |
| JP | 2000-341264 A1 | 12/2000 |
| JP | 2001-167086 A1 | 6/2001 |
| JP | 2002-44071 A1 | 2/2002 |
| WO | WO-98/31114 A1 | 7/1998 |
| WO | 01/37517 A2 | 5/2001 |

* cited by examiner

FIG. 7

```
1   <?xml version="1.0"?>
2   <ProgramIndex xmlns="http://www.foo.co.jp/2001/ProgramIndex/">
3     <Target>
4       <Area id="Tokyo"/>
5       <Channel network="Terrestrial">8</Channel>
6       <StartTime>2001-03-24T19:00:00.0+09:00</StartTime>
7       <EndTime>2001-03-24T21:00:00.0+09:00</EndTime>
8       <Title>NIGHT GAME: KYOJIN V.S. HANSHIN</title>
9     </Target>
10    <Story title="SCORING POINT SCENE">
11      <Segment>
12        <StartPosition>00:20:22.000</StartPosition>
13        <EndPosition>00:21:14.000</EndPosition>
14        <description>A TOP OF A 3RD INNING  XX CAME HOME BY SACRIFICE FLY OF YY</description>
15      </Segment>
16      <Segment>
17        <StartPosition>00:42:00.000</StartPosition>
18        <EndPosition>00:45:12.000</EndPosition>
19        <description>A BOTTOM OF A 5TH INNING A COME-FROM-BEHIND TWO-RUN</description>
20      </Segment>
21      ......
22    </Story>
23    <Story title="TODAY'S POINT OF INTEREST">
24      <Segment>
25        <StartPosition>00:31:41.000</StartPosition>
26        <EndPosition>00:32:03.000</EndPosition>
27        <description>A FANTASTIC PLAY OF ZZ</description>
28      </Segment>
29      ......
30    </Story>
31  </ProgramIndex>
```

FIG. 8

| ID | BROADCASTING STATION | BROADCASTING DATE | START TIME | FINISH TIME | UTILIZATION AVAILABILITY FLAG |
|----|----------------------|-------------------|------------|-------------|-------------------------------|
| 0  | NHH                  | 2002/3/4          | 10:00      | 10:30       | AVAILABILE                    |
| 1  | TBB                  | 2002/4/2          | 20:00      | 21:00       | UNAVAILABILE                  |

FIG. 9

```
1   <?xml version="1.0"?>
2   <ProgramIndex xmlns="http://www.foo.co.jp/2001/ProgramIndex/">
3     <License>
4       <ApprovedBy>XX METADATA SERVICE CENTER</ApprovedBy>
5       <Date>2001-03-27T23:58:43.0+09:00</Date>
6     </License>
7     <Target>
8       <Area id="Tokyo"/>
9       <Channel network="Terrestrial">8</Channel>
10      <StartTime>2001-03-24T19:00:00.0+09:00</StartTime>
11      <EndTime>2001-03-24T21:00:00.0+09:00</EndTime>
12      <Title>NIGHT GAME: KYOJIN V.S. HANSHIN</title>
13    </Target>
14    <Story title="SCORING POINT SCENE">
15      <Segment>
16        <StartPosition>00:20:22.000</StartPosition>
17        <EndPosition>00:21:14.000</EndPosition>
18        <description>A TOP OF A 3RD INNING  XX CAME HOME BY SACRIFICE FLY OF YY</description>
19      </Segment>
20      <Segment>
21        <StartPosition>00:42:00.000</StartPosition>
22        <EndPosition>00:45:12.000</EndPosition>
23        <description>A BOTTOM OF A 5TH INNING A COME-FROM-BEHIND TWO-RUN</description>
24      </Segment>
25      ......
26    </Story>
27    <Story title="TODAY'S POINT OF INTEREST">
28      <Segment>
29        <StartPosition>00:31:41.000</StartPosition>
30        <EndPosition>00:32:03.000</EndPosition>
31        <description>A FANTASTIC PLAY OF ZZ</description>
32      </Segment>
33      ......
34    </Story>
35  </ProgramIndex>
```

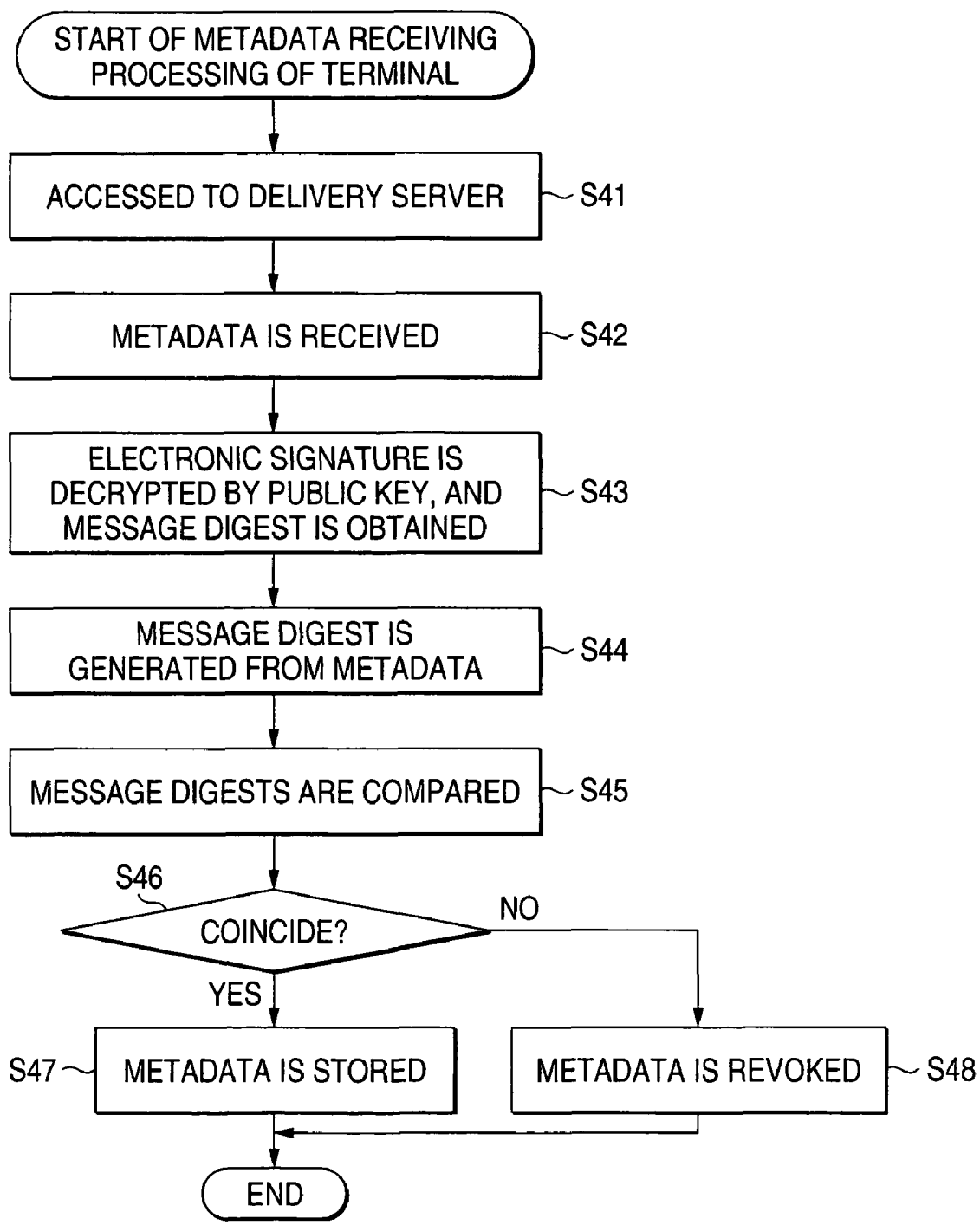

INFORMATION PROVIDING SYSTEM, AND INFORMATION PROCESSING APPARATUS AND METHOD

TECHNICAL FIELD

This invention relates to an information providing system, and information processing apparatus and method, and in particular, relates to an information providing system, and information processing apparatus and method which are designed such that secondary utilization of broadcasting contents can be realized along with copyrights of the broadcasting contents being protected.

BACKGROUND ART

This applicant proposed previously to secondarily utilize the broadcasting contents as JP-A-2000-237671. In the previous proposal, the contents which were broadcasted are once stored in a receiving device. Metadata in which information for secondarily utilizing this broadcasting content was described is separately delivered to the receiving device. The receiving device, based upon the metadata, extracts and reproduces only digests and predetermined portions of the broadcasting contents. Accordingly, it becomes possible for a viewer to view only a portion that he or she wishes to watch, within a limited time.

In the meantime, in the broadcasting contents, in a lot of cases, advertising images (images of commercial films) are included. When delivered is the metadata for secondarily utilizing the broadcasting content except for a portion of this advertising image, there is a fear that a benefit of an advertising sponsor who is providing the broadcasting content on the assumption that the advertising image is viewed becomes impaired.

DISCLOSURE OF THE INVENTION

This invention is made in view of suchlike situation, and is one which is designed such that secondary utilization of the broadcasting contents can be realized along with copyrights of the broadcasting contents being protected.

An information providing system of the invention is characterized in that, reproduction data, in which a portion of a content to be reproduced and an order of reproduction are defined, is transmitted from a first information processing apparatus through a network to a second information processing apparatus, and the second information processing apparatus registers the reproduction data which was transmitted from the first information processing apparatus and adds utilization information which relates to utilization of the content, and a third information processing apparatus receives delivery of the reproduction data to which the utilization information was added, from the second information processing apparatus through the network, and on the basis of the reproduction data which delivery was received, the content can be utilized.

The first information processing apparatus of the invention is characterized by having obtaining means for obtaining reproduction data in which a portion of a content to be reproduced and an order of reproduction are defined, specifying means for specifying a content which is defined by the reproduction data obtained by the obtaining means, judging means for judging a condition which relates to utilization of the content specified by the specifying means, adding means for adding utilization information which relates to utilization of the content to the reproduction data, on the basis of a result of judgment by the judging means, and output means for outputting the reproduction data to which the utilization information was added by the adding means.

It is possible to further have receiving means for receiving the reproduction data which was transmitted from a first other information processing apparatus through a network, registering means for registering the reproduction data which was received by the receiving means, and accepting means for accepting a request of transmission of the reproduction data from a second other information processing apparatus through the network.

The adding means can add the utilization information to the reproduction data, when the registering means registers the reproduction data which was transmitted from the first other information processing apparatus.

The adding means can add the utilization information to the reproduction data, when, on the basis of the request which was accepted by the accepting means, the obtaining means obtains a predetermined one out of the reproduction data which was registered by the registering means, and the output means outputs the reproduction data through the network to the second other information processing apparatus.

It is possible to further have preparing means for preparing an electronic signature which is added to the reproduction data, and the output means can output the reproduction data with the electronic signature added.

It is possible to further have distributing means for distributing a public key which is necessary to decrypt the electronic signature to the second other information processing apparatus.

It is possible to design that the above-described content is a broadcasting content, and the reproduction data is metadata which utilizes the broadcasting content.

A first information processing method of the invention, a program of a recording medium and a program are characterized by including an obtaining step for obtaining reproduction data in which a portion of a content to be reproduced and an order of reproduction are defined, a specifying step for specifying a content which is defined by the reproduction data obtained by the obtaining step, a judging step for judging a condition which relates to utilization of the content specified by the specifying step, an adding step for adding utilization information which relates to utilization of the content to the reproduction data, on the basis of a result of judgment by the judging step, and an output step for outputting the reproduction data to which the utilization information was added by the adding step.

A second information processing apparatus of the invention is characterized by having obtaining means for obtaining reproduction data in which a portion of a content to be reproduced and an order of reproduction are defined, judging means for judging utilization information which relates to utilization of a corresponding content, which is included in the reproduction data obtained by the obtaining means, and utilization means for utilizing the content according to the reproduction data, on the basis of a result of the judgment of the judging means.

It is possible to further have first receiving means for receiving the reproduction data from other information processing apparatus through the network, and storing means for storing the reproduction data which was received by the first receiving means, and the obtaining means obtains the reproduction data which is stored in the storing means.

It is possible to further have a first proving means for proving the electronic signature which is added to the reproduction data, and the storing means stores the reproduction data, on the basis of a result proved by the first proving means.

It is possible to further have a second receiving means for receiving a first public key which is necessary to decrypt the electronic signature from the other information processing apparatus.

It is possible to further have holding means for holding a second public key which is necessary to decrypt a certificate which is attached to the first public key, and a second proving means for proving the certificate, by utilizing the second public key which is held in the holding means.

It is possible to design that the above-described content is a broadcasting content, and the reproduction data is metadata which utilizes the broadcasting content.

A second information processing method of the invention, a program of a recording medium and a program are characterized by including an obtaining step for obtaining reproduction data in which a portion of a content to be reproduced and an order of reproduction are defined, a judging step for judging utilization information which relates to utilization of a corresponding content, which is included in the reproduction data obtained by the obtaining step, a utilization step for utilizing the content according to the reproduction data, on the basis of a result of the judgment of the judging step.

In an information providing system of the invention, reproduction data which was transmitted from a first information processing apparatus is registered in a second information processing apparatus, and a third information processing apparatus receives a delivery of the reproduction data from the second information processing apparatus, and utilizes a content, on the basis of the reproduction data whose delivery was received.

In the first information processing apparatus and the method, the recording medium, and the program of the invention, a content which is defined by reproduction data which was obtained is specified, and utilization information which relates to utilization of the specified content is added to the reproduction data and outputted.

In the second information processing apparatus and the method, the recording medium, and the program of the invention, reproduction data is obtained, and a content is utilized according to the reproduction data, on the basis of a judgment result of the utilization information, which is included in the reproduction data obtained.

BRIEF DESCRIPTION OF THE DRAWINGS

FIG. 7 is a view showing an example of the metadata.

FIG. 8 is a view showing an example of the content management table.

FIG. 9 is a view showing an example of the metadata in which utilization availability information was read.

FIG. 10 is a flow chart explaining metadata receiving processing of the terminal of FIG. 1.

BEST MODE FOR CARRYING OUT THE INVENTION

Figure 1:
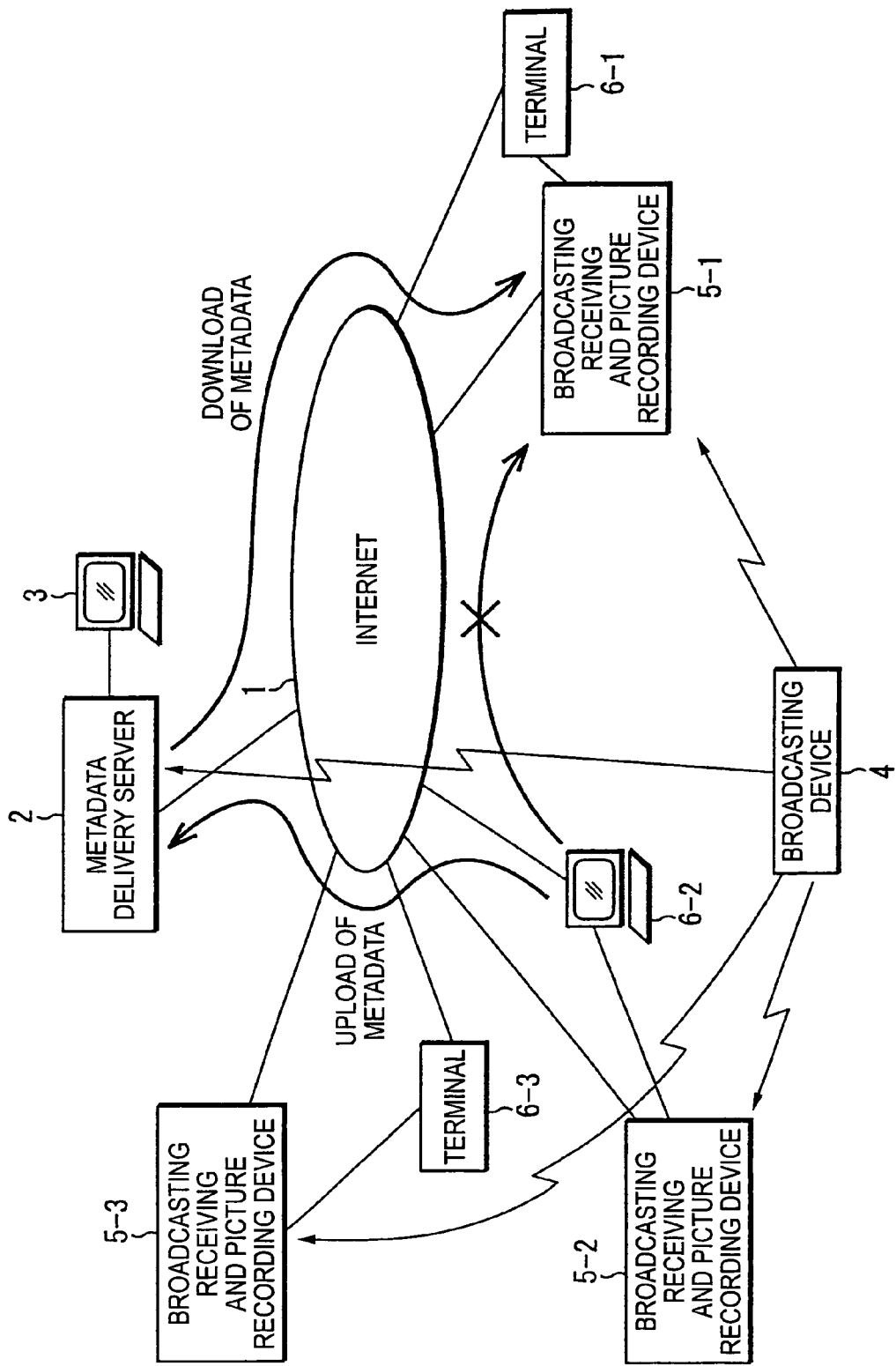
FIG. 1 is a block diagram showing a structural example of an information providing system to which the invention was applied.

FIG. 1 indicates a structural example of an information providing system to which this invention was applied. In this information providing system, to Internet 1, a metadata delivery server 2 is connected. To this metadata delivery server 2, an authoring system 3 is connected.

To the Internet 1, further, broadcasting receiving and picture recording devices 5-1 to 5-3, and terminals 6-1 to 6-3 are connected. The broadcasting receiving and picture recording devices 5-1 to 5-3 (hereinafter, in case that there is no necessity to distinguish these individually, referred to simply as a broadcasting receiving and picture recording device 5) receive radio waves that a broadcasting device 4 broadcasted, and record broadcasting contents. The terminals 6-1 to 6-3 are configured integrally with the broadcasting receiving and picture recording devices 5-1 to 5-3, respectively, according to need. The terminals 6-1 to 6-3 (hereinafter, in case that there is no necessity to distinguish these individually, referred to simply as a terminal 6) generate metadata of the broadcasting content which was recorded in the corresponding broadcasting receiving and picture recording device 5, and transmit through the Internet 1 to the metadata delivery server 2.

The authoring system 3 of the metadata delivery server 2 also receives the radio waves of the broadcasting device 4, and generates the metadata based upon the broadcasting content, and registers in the metadata delivery server 2.

In the metadata delivery server 2, by this means, registered are metadata which was delivered from each terminal 6, and metadata which was generated by the authoring system 3. The metadata delivery server 2, on the basis of a request from the terminal 6, delivers a predetermined one out of the metadata which was registered, through the Internet 1 to the terminal 6.

In addition, in FIG. 1, it was designed that three units of the broadcasting receiving and picture recording device 5 and the terminal 6 are connected to the Internet 1, respectively, but, the number of the units to be connected is arbitrary. Also, the number of the broadcasting device 4 is arbitrary.

Figure 2:
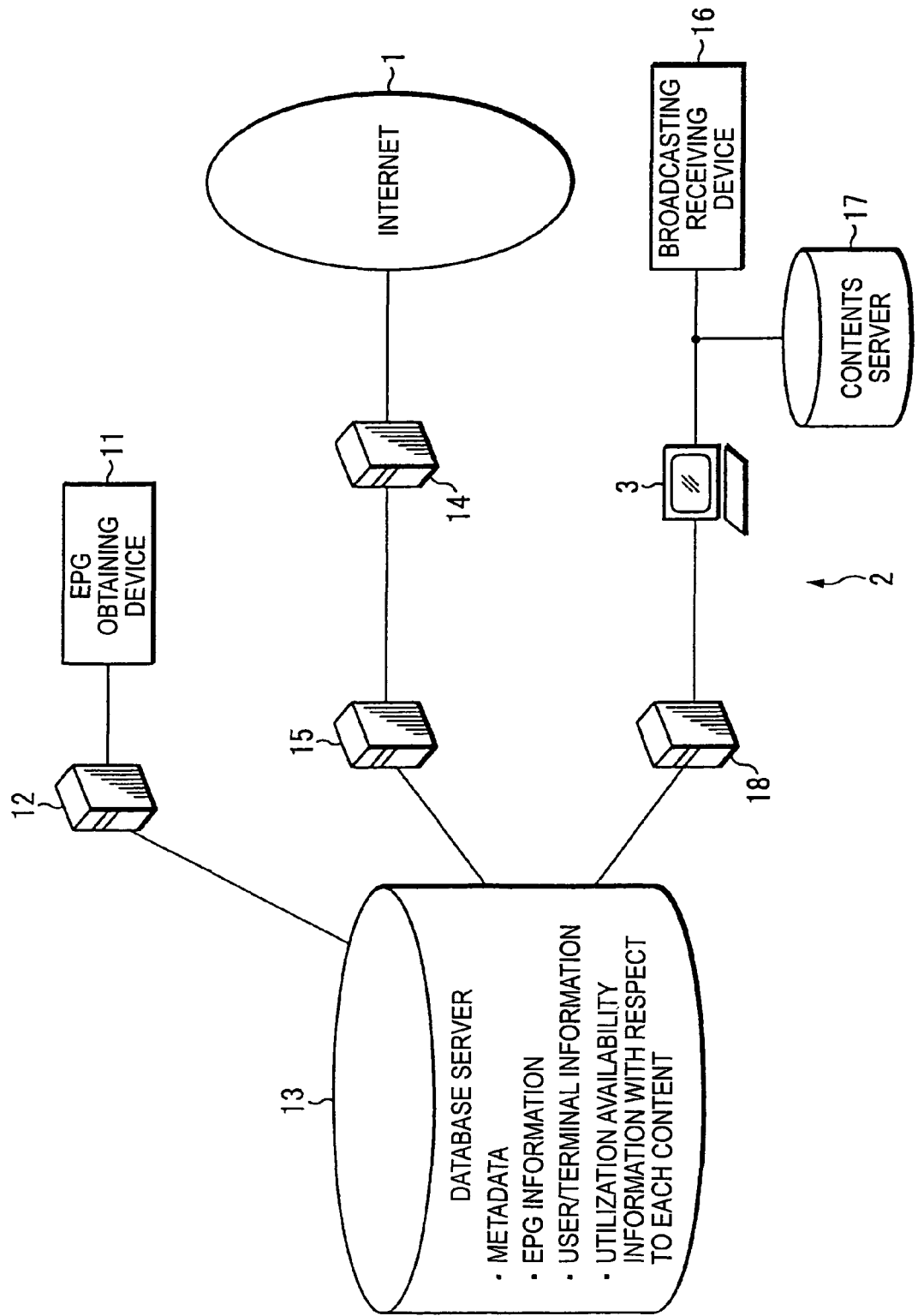
FIG. 2 is a view showing a structure of a metadata delivery server of FIG. 1.

FIG. 2 indicates a structural example of the metadata delivery server 2. An EPG obtaining device 11 obtains EPG (Electrical Program Guide) which relates to the broadcasting contents that each broadcasting device is broadcasting. An EPG registration use application server 12 supplies EPG data which was obtained by the EPG obtaining device 11 to a database server 13 to be recorded.

A metadata delivery/upload use application server 15 supplies the metadata which is transmitted (uploaded) from the terminal 6 through the Internet 1, to the database server 13 and have it registered, and adversely, carries out processing for reading out the metadata which is registered in the database server 13 and for delivering to the terminal 6 through the Internet 1. An HTTP (Hyper Text Transfer Protocol) server 14 carries out interface processing between the metadata delivery/upload use application server 15 and the Internet 1.

A broadcasting receiving device 16 receives the radio waves that the broadcasting device 4 broadcasted, and supplies the broadcasting contents to a content server 17, and has it registered. The authoring system 3 generates the metadata on the basis of the contents which were registered in the content server 17. A matadata registration use application server 18 supplies the metadata which was generated by the authoring system 3 to be registered.

By this means, in the database server 13, in addition to EPG information which was obtained by the EPG obtaining device 11, the metadata which was transmitted from each terminal 6 through the Internet 1, and the metadata which was generated by the authoring system 3 are registered.

In the database server 13, in addition to this, terminal information of the terminal 6, user information of its user, and utilization availability information with respect to each broadcasting content (content management table) and so on are registered.

Figure 3:
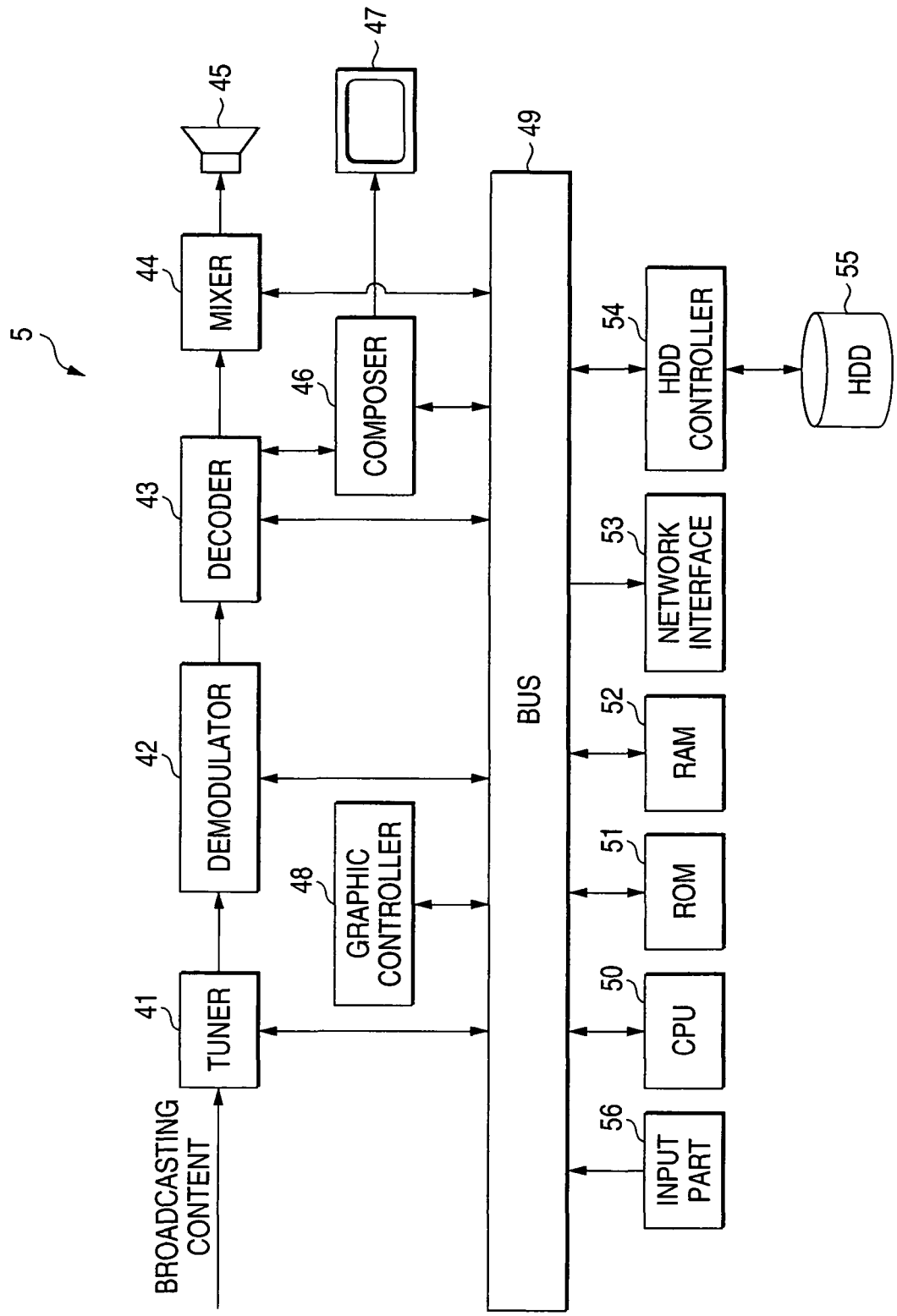
FIG. 3 is a block diagram showing a structure of a broadcasting receiving and picture recording device of FIG. 1.

The broadcasting receiving and picture recording device is configured, for example, as shown in FIG. 3. A tuner 41 receives the radio waves that the broadcasting device 4 outputted, and outputs base band signals including the broadcasting contents to a demodulator 42. The demodulator 42 demodulates the base band signals which were supplied from the tuner 41, and outputs to a decoder 43. The decoder 43 decodes demodulated signals which were supplied from the demodulator 42, or signals which were read out from a hard disc drive (HDD) 55 through a hard disc drive (HDD) controller 54, and generates image data and sound data.

A mixer 44 combines other sound data which was supplied through a bus 49 with the sound data which was supplied from the decoder 43, and outputs to a speaker 45. A composer 46 combines image data which was supplied from the decoder 43 and image data which was generated by a graphic controller 48 and supplied from the bus 49, and outputs to a monitor 47.

CPU (Central Processing Unit) 50 carries out various kinds of processing, according to a program which is stored in ROM (Read Only Memory) 51. In the ROM 51, in addition to this, parameters which are necessary for the CPU 50 to carry out the various processing, and so on are also stored. In RAM (Random Access Memory) 52, a program and data which are necessary for the CPU 50 to carry out processing, and so on are accordingly stored. An input part 56 outputs a corresponding instruction to the CPU 50, when operated by a user.

A network interface (I/F) 53 carries out communication processing with various kinds of public lines and LAN (Local Area Network), in addition to the Internet 1. The hard disc drive controller 54 controls the hard disc drive 55, and has the broadcasting contents which were received by the tuner 41 recorded. Also, the metadata which was obtained from the network interface 53 is supplied to the hard disc drive 55 and recorded.

Figure 4:
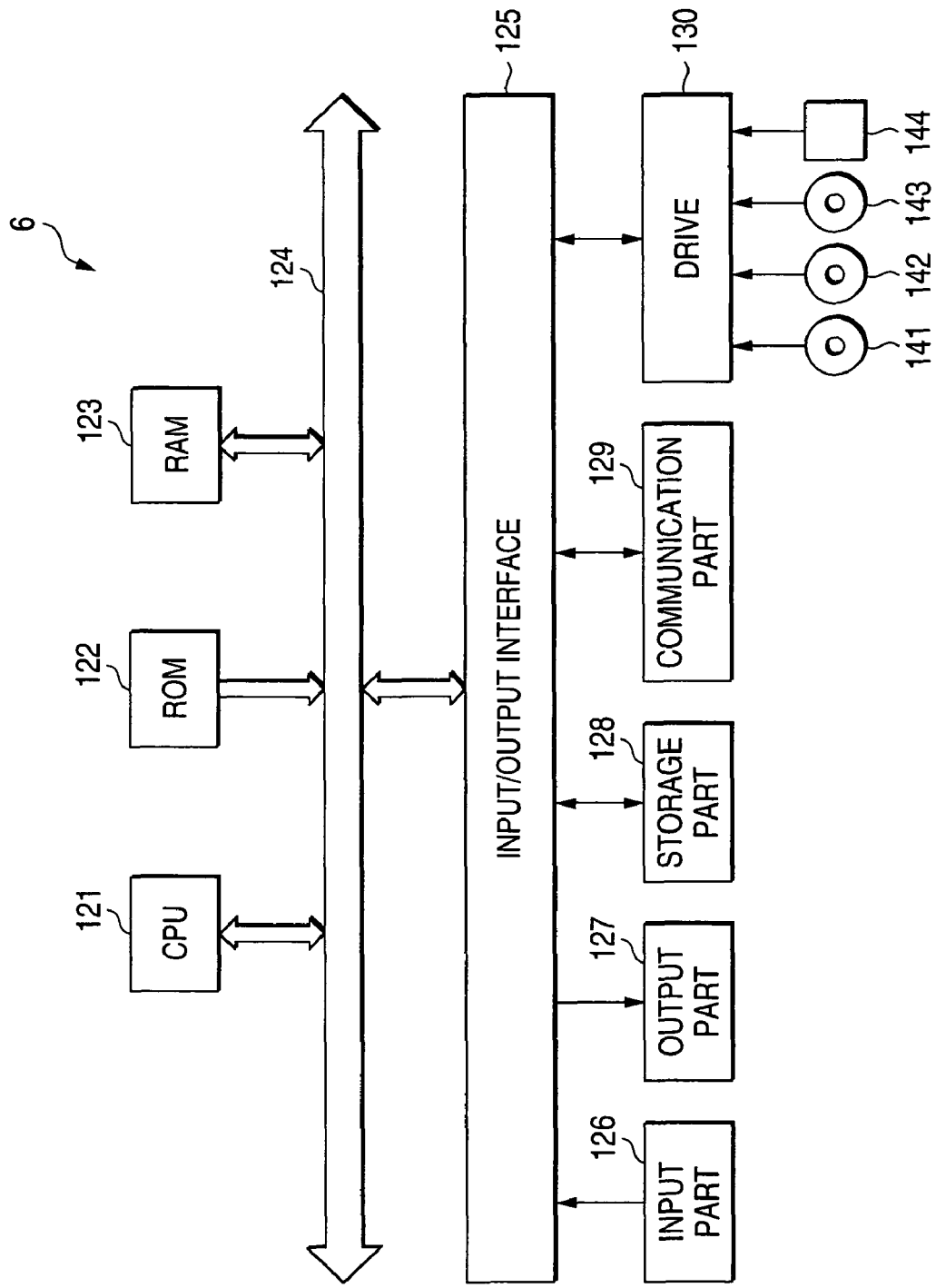
FIG. 4 is a block diagram showing a structure of a terminal of FIG. 1.

FIG. 4 indicates a structural example of the terminal 6. In FIG. 4, CPU 121 carries out various kinds of processing according to a program which was stored in ROM 122, or a program which was loaded from a storage part 128 to RAM 123. In the RAM 123, also, data which is necessary for the CPU 121 to carry out various kinds of processing, and so on are accordingly stored.

The CPU 121, the ROM 122 and the RAM 123 are mutually connected through a bus 124. To this bus 124, also, an input/output interface 125 is connected.

To the input/output interface 125, an input part 126 which comprises a keyboard, a mouse and so on, a display which comprises CRT (Cathode Ray Tube), LCD (Liquid Crystal Display) and so on, and an output part 127 which comprises a speaker and so on, a storage part 128 which comprises a hard disc and so on, and a communication part 129 which comprises a modem, a terminal adapter and so on are connected. The communication part 129 carries out communication processing through a network including the Internet 1, and communication processing with corresponding broadcasting receiving and picture recording device 5.

To the input/output interface 125, also, a drive 130 is connected according to need, and a magnetic disc 141, an optical disc 142, a magneto-optical disc 143, or a semiconductor memory 144 and so on are accordingly fixed, and a computer program which was read out from them is installed in the storage part 128 according to need.

Next, an operation of the system of FIG. 1 will be explained. A user of the broadcasting receiving and picture recording device 5, when the broadcasting device 4 receives contents to be broadcasted, operates the input part 56, and instructs reception of the content of a predetermined channel. The CPU 50, when received an input of this instruction from the input part 56, controls the tuner 41 to receive the radio waves of the content of the designated channel.

The tuner 41, when received the radio waves of the designated channel, outputs that received signals to the demodulator 42. The demodulator 42 demodulates the received signals and outputs them to the decoder 43. The decoder 43 decodes demodulated signals, and outputs image signals to the monitor 47 through the composer 46 to display them. Also, the decoder 43 outputs sound signals to the speaker 45 through the mixer 44 to be sounded.

By this means, a user of the broadcasting receiving and picture recording device 3 can view and hear the contents of a desired channel.

Also, in case that a user instructed recording of the received contents, signals which were outputted from the decoder 43 are supplied through the hard disc drive controller 54 to the hard disc drive 55, and recorded in a built-in hard disc. It is designed that this recording operation can be carried out even in such a situation that image signals and sound signals are not outputted from the monitor 47 or the speaker 45.

When reproduction of the contents which are recorded in the hard disc is instructed on the basis of an operation of the input part 56, the CPU 50 controls the hard disc drive controller 54, to reproduce the designated content which is recorded in a hard disc of the hard disc drive 55. Reproduced signals are decoded by the decoder 43, and the image signals are outputted through the composer 46 to the monitor 47 and displayed. Also, the sound signals are outputted through the mixer 44 to the speaker 45.

A user can view and hear the contents which were recorded in the hard disc, by this means, at an arbitrary timing.

Also, a user can have the broadcasting contents which were recorded in the hard disc read out by the terminal 6 and have it recorded in the storage part 128.

Figure 5:
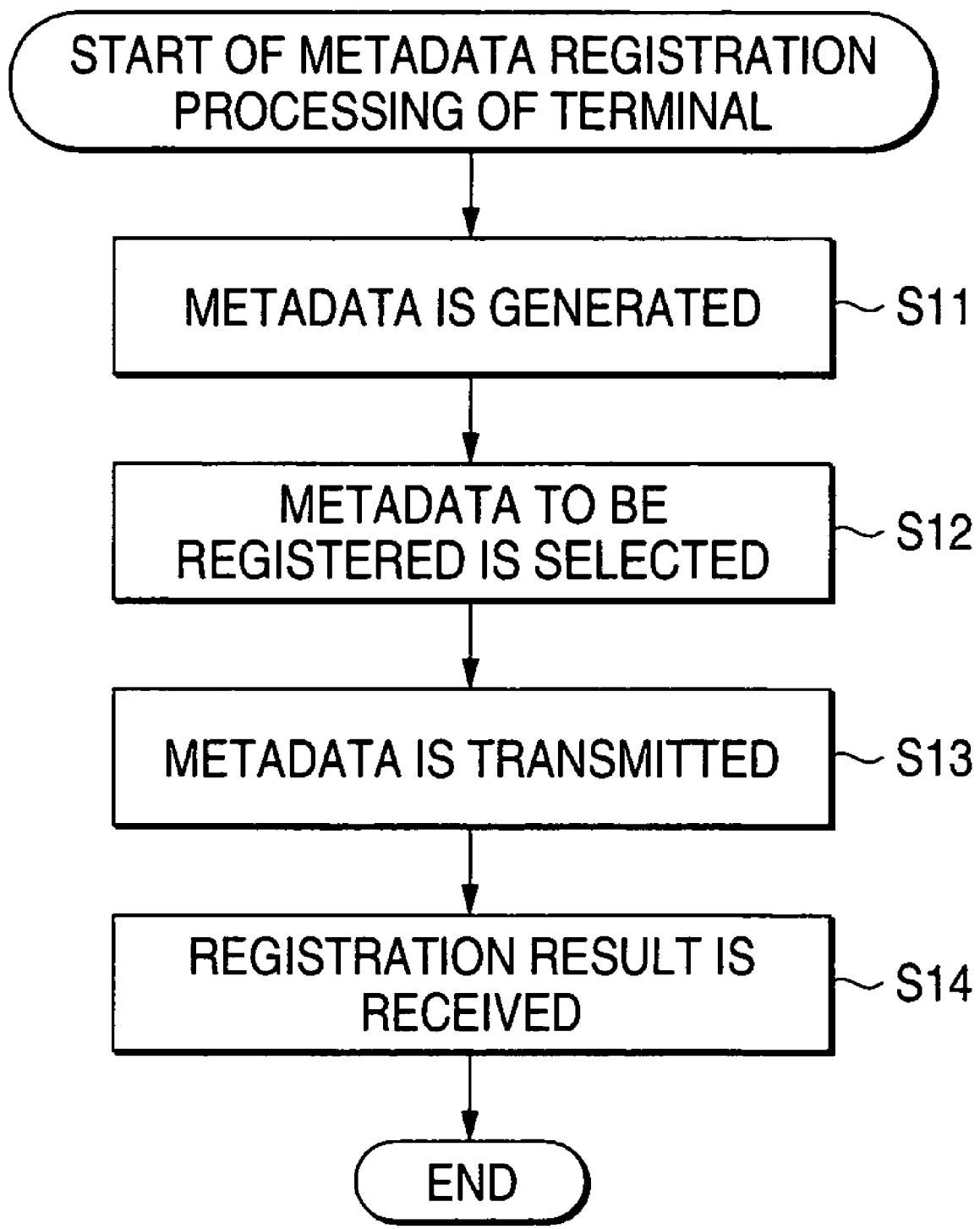
FIG. 5 is a flow chart explaining metadata registering processing of the terminal of FIG. 1.
Figure 6:
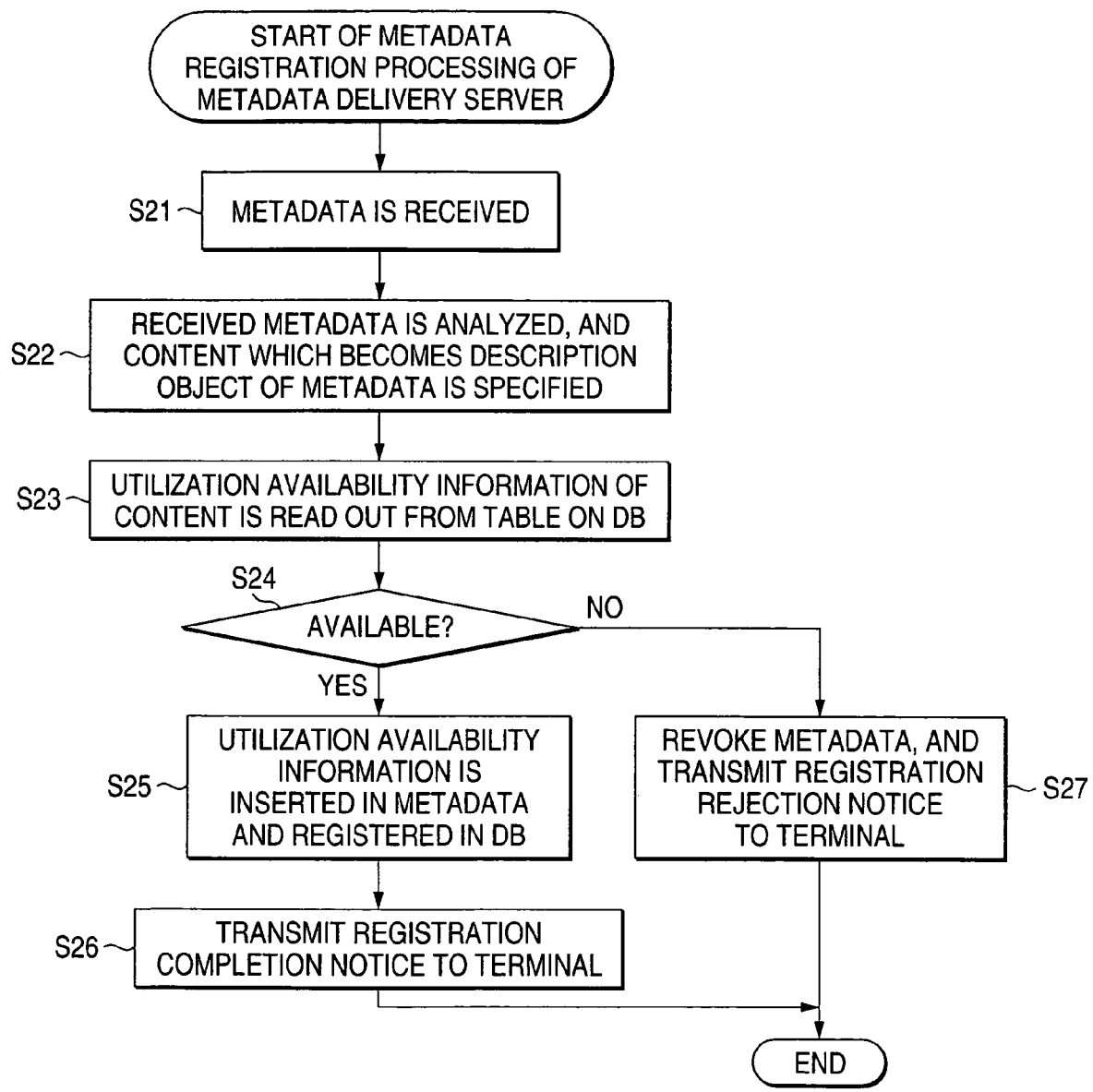
FIG. 6 is a flow chart explaining metadata registering processing of the metadata delivery server of FIG. 1.

Next, with reference to flow charts of FIG. 5 and FIG. 6, processing for registering the metadata generated by the terminal 6 in the metadata delivery server 2 will be explained. FIG. 5 indicates processing of the terminal 6 in this case, and FIG. 6 indicates processing of the metadata delivery server 2.

Firstly, with reference to the flow chart of FIG. 5, metadata registration processing of the terminal 6 will be explained. In addition, on this occasion, it is designed that a user of the terminal 6-1 generates the metadata, and registers in the metadata delivery server 2.

In a step S11, a user of the terminal 6-1 reads out the broadcasting contents which are stored in the storage part 128, and has it displayed on a display part which comprises the output part 127, and operates the input part 126, and selects accordingly a predetermined scene and son on, and thereby, carries out editing processing. The CPU 121, in response to this editing processing, generates metadata which represents editing contents. When the input part 126 is operated and recording is instructed, the CPU 121 supplies the generated metadata to the storage part 128, and has it stored. IN addition, an example of the metadata will be described later with reference to FIG. 7.

In the storage part 128, by this means, arbitrary number of the metadata is stored. Then, a user of the terminal 6-1 operates the input part 126, and instructs display of a list of the metadata to be registered in the metadata delivery server 2. At this time, the CPU 121 reproduces the list of the metadata which is stored in the storage part 128, and outputs to the display part of the output part 127 and have it displayed. A user of the terminal 6-1, taking a look at this display, selects the metadata to be registered in the metadata delivery server 2 by operating the input part 126. In a step S12, when the CPU 121 selects the metadata on the basis of the input from the input part 126, in a step S13, the metadata which is stored in the storage part 128 is reproduced, and transmitted from the communication part 129 through the Internet 1 to the metadata delivery server 2.

When transmission processing is completed, as described later, the metadata delivery server 2 informs registration completion or registration rejection (steps S26, S27 of FIG. 6). Then, in a step S14, the CPU 121 of the terminal 6-1, when received a registration result which was transmitted from the metadata delivery server 2 through the communication part 129, outputs it to the display part of the output part 127 and have it displayed. From this display, a user can learn whether the metadata is correctly registered or not. In case that it can not be registered correctly, the registration processing is repeated again.

Next, with reference to the flow chart of FIG. 6, registration processing of the metadata delivery server 2 which is carried out in response to such registration processing of the terminal 6-1 will be explained.

In a step S21, processing for receiving the metadata which was transmitted from the terminal 6-1 (transmitted by the processing of the step S13 of FIG. 5) is carried out in the metadata delivery server 2. That is, when the metadata is transmitted from the terminal 6-1 through the Internet 1, this is supplied through the HTTP server 14 to the metadata delivery/upload use application server 15.

The application server 15 analyses the received metadata in a step S22, and specifies the content which has become a description object of that metadata.

That is, the metadata is configured, for example, as shown in FIG. 7. description relating to the content that this metadata is targeted is made in a scope from Target at its foremost to /Target (scope from a 3rd line to a 9th line).

<Area id='Tokyo'> at a 4th line indicates that an area where this broadcasting content was broadcasted is "Tokyo". <Channel network='Terrestrial'>8</Channel> at a 5th line indicates that this broadcasting content is a broadcasting content which was broadcasted in "an 8th channel of terrestrial waves". Furthermore, <StartTime> at a 6th line indicates that a start time of that broadcasting is "19 hour 00 minute, March 24, 2001", and <EndTime> at a 7th line indicates that a finish time is "21 hour 00 minute, March 24, 2001". Also, <title> at an 8th line indicates that a title of that broadcasting content is "Night gate: Kyojin v.s. Hanshin".

In a step S22, a broadcasting content is specified on the basis of this area, a channel, a broadcasting start time and finish time, and a title.

In an example of the metadata of FIG. 7, <Story title> is configured by two of a story which is "scoring point scene" and a story which is "Today's point of interest".

In FIG. 7, as the story of "scoring point scene", first two segments are illustrated by an example. The first segment, its start position is set to be a position of "00 hour 20 minute 22 second", and its finish position is set to be a position of "00 hour 21 minute 14 second". As information (description) for distinguishing its content, described is a comment of "a top of a 3rd inning ΔΔ came home by a sacrifice fly of ○○". A 2nd segment is a portion from "00 hour 42 minute 00 second" to "00 hour 45 minute 12 second", and added is a comment of "a bottom of a 5th inning a come-from-behind 2 run".

In the story of "Today's point of interest", the first one segment is illustrated by an example. This segment is set to be a portion of a period from "00 hour 31 minute 41 second" to "00 hour 32 minute 03 second". As the information for distinction, a comment of "a fantastic play of □□" is added.

Next, it goes to a step S23, the application server 15 reads out the utilization availability information of the contents from the content management table which is recorded in the database server 13.

That is, in the database server 13, for example, the content management table, as shown in FIG. 8 is registered in advance. In this content management table, registered are ID which is assigned to the content, a broadcasting station (broadcasting device) which broadcasted the content, a broadcasting date, a start time, a finish time, and a flag of availability of utilization. For example, in an example of FIG. 8, it is described in a content in which ID is "0" that, a broadcasting content that the broadcasting station is "NHK", the broadcasting data is "March 4, 2002", the start time is "10 hour 00 minute", and the finish time is "10 hour 30 minute" can be utilized ("available"). In contrast to this, it is described that a content which was broadcasted from "20 hour 00 minute" to "21 hour 00 minute" on "April 2, 2002" at a broadcasting station "TBB" in which ID is "1" can not be utilized (it is "unavailable").

In a step S24, the application server 15 judges whether or not the utilization availability information (utilization availability flag in FIG. 8) which was read out in the step S23 indicates that it is possible to be utilized. In case that this content can be utilized (for example, in case of a content in which ID of FIG. 8 is "0"), it goes to a step S25, and the application server 15 inserts the utilization availability information in the metadata, and supplies to the database server 13, and has it registered.

FIG. 9 indicates a situation that the utilization availability information was added to the metadata of FIG. 7, by this means. That is, in this example, to the metadata shown in FIG. 7, <License> is added at a 3rd line to a sixth line. As a content thereof, it is described that it is "XX metadata service center" who gave this license, and that its date is "23 hour 58 minute 43 second, March 27, 2001".

The database server 13 informs the application server 15 that the registration was completed, when registered is the metadata in which the utilization availability information transferred from the application server 15 was filled. The application server 15, when received this notice from the database server 13 in the step S26, transmits a registration completion notice to the terminal 6-1. That is, this registration completion notice is transmitted from the HTTP server 14 through the Internet 1 to the terminal 6-1.

On one hand, in the step S24, in case that it is judged that the utilization availability information does not become available (in case that it is unavailable), it goes to a step S27, and the application server 15 revokes the metadata which was transmitted from the terminal 6-1, and transmits the registration rejection notice to the terminal 6-1. For example, in case of metadata relating to the content in which ID is "1", its utilization is not allowed. Accordingly, in this case, registration of the metadata to the database server 13 is rejected.

By this, it is avoided that secondary utilization of a content that a manager who manages utilization of the content does not allow is carried out unjustly.

In addition, in the forgoing, as a condition of a license, only availability of utilization is described, but it is also possible to describe an expiring data in which a content can be utilized, a user or a terminal that can utilize the content, and so on.

Or, also, it is also possible that a user describes an address of a server to which availability of its utilization should be inquired, at a time point of viewing and hearing the content, on the basis of its metadata, as the content of the license, and availability of utilization is inquired to the server, at the time of utilization, in each case.

Also, it is possible to describe information which specifies a metadata composer (e.g., name of the metadata composer, ID of the composer, ID of the terminal and so on) as accompanying information.

Furthermore, in the foregoing, it was designed that availability of viewing and hearing is determined only based upon the flag of availability of utilization, but it is possible to fractionate a content and set a predetermined portion therein (e.g., an advertising image portion, a portion of announcing a sponsor and so on) as a portion which should be reproduced by all means, and to set other predetermined portion as a portion which can not be utilized. In this case, in case that a zone in which utilization is prohibited is described in the metadata, registration thereof is rejected. In the same manner, also in case that a zone which should be viewed and heard by all means is not included in the metadata, registration of the metadata is rejected.

Furthermore, in the foregoing example, it was designed that the utilization availability information is added to the metadata, on the occasion of registering the metadata, but it is also possible to carry out the addition on the occasion of distributing the registered metadata to a user.

By carrying out the above, to the database server 13 of the metadata delivery server 2, from many users of the terminal 6, as a editing result of the broadcasting content, the metadata is transmitted and registered. In addition, this metadata is, also in the metadata delivery server 2, generated uniquely, and registered.

In this case, by the broadcasting receiving device 16, broadcasting radio waves of the broadcasting device 4 is received, and broadcasting contents are registered in the content server 17. The authoring system 3 carries out authoring for the contents which were registered in the content server 17, and generates the metadata. The metadata registration use application server 18 supplies the metadata which was generated by the authoring system 3 to the database server 13, and has it registered.

By carrying out the above, as to the metadata which was registered in the metadata delivery server 2, each user receives delivery thereof, and can utilize it. Next, with reference to flow charts of FIG. 10 and FIG. 11, processing in this case will be explained.

Figure 11:
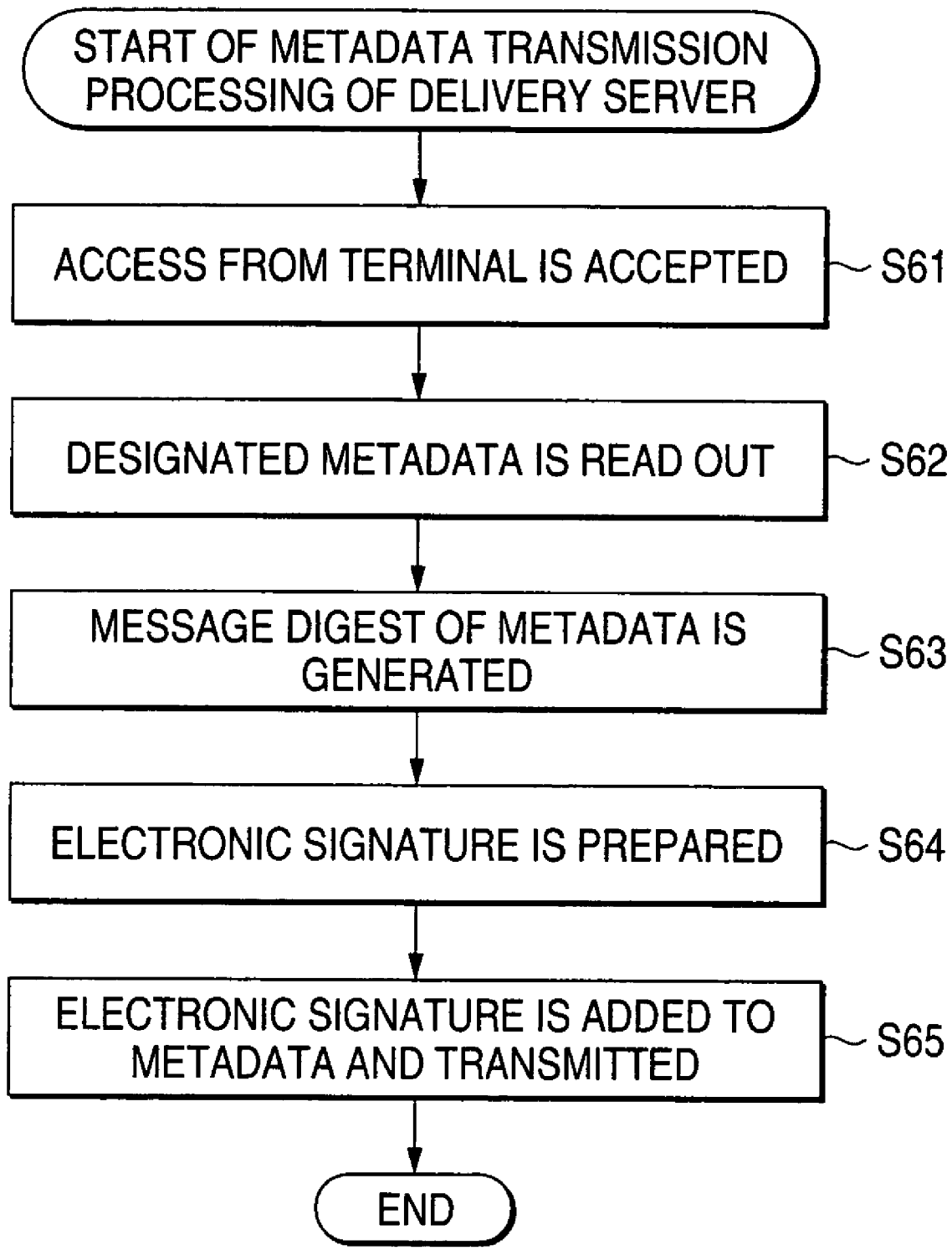
FIG. 11 is a flowchart explaining metadata transmitting processing of the metadata delivery server of FIG. 1.

FIG. 10 indicates processing of the terminal 6, and FIG. 11 indicates processing of the delivery server 2 which corresponds to this.

Firstly, with reference to FIG. 10, the processing of the terminal 6 will be explained. In addition, on this occasion, for example, it is assumed that the terminal 6-2 receives delivery of the metadata.

Firstly in a step S41, the CPU 121 of the terminal 6-2, when an access to the metadata delivery server 2 is instructed by a user on the basis of an operation of the input part 126, controls the communication part 129, and has it access to the metadata delivery server 2. At this time, the CPU 121 simultaneously transmits designation information for designating metadata which should receive delivery designated by a user on the basis of an input from the input part 126.

The metadata delivery server 2 transmits the metadata on the basis of this designation information (step S65 of FIG. 11). Then, in the step S42, the CPU 121 receives the metadata which was transmitted from the metadata delivery server 2 through the communication part 129. To this metadata, the electronic signature is added. Then, in the step S43, the CPU 121 decrypts the electronic signature which is added to the metadata received by the processing of the step S42 by a public key which is stored in the storage part 128 (a method of obtaining this public key will be explained later with reference to a flow chart of FIG. 13), and obtains message digests.

Furthermore, the CPU 121, in the step S44, on the basis of the metadata received in the step S42, generates the message digests. This message digest is configured by a bit pattern of fixed length (e.g., about 128 bits) which was generated by applying a predetermined algorithm to the metadata.

As this algorithm, for example, it is possible to use MD5 by B. Kaliski, R. Rivest et al. The message digest like this has a nature that probability that the same message digest is generated from different data is extremely low, and it is as a matter of fact impossible to alter original data so that the message digest is not changed. Accordingly, the message digest is often likened to fingerprint.

Next, in a step S45, the CPU 121 compares the message digest which was obtained by decrypting the electronic signature in the processing of the step S43 and the message digest which was generated by itself on the basis of the metadata in the processing of the step S44. If the received metadata is not one which was illegally altered, the two message digests coincide. In contrast to this, in case that it is one which was altered, the two message digests do not coincide.

Then, in a step S46, the CPU 121 judges whether the two message digest coincide or not, and in case that they coincide, the received metadata is not altered, and therefore, it goes to a step S47, and the metadata is supplied to the storage part 128 and stored.

In contrast to this, in a step S46, in case that it was judged that the two message digests do not coincide, since there is a fear that metadata thereof has been altered, it goes to a step S48, and the CPU 121 revokes the received metadata.

Next, with reference to the flow chart of FIG. 11, metadata transmission processing of the metadata delivery server 2 which is carried out in response to the above-described processing of the terminal 6-2 will be explained.

In a step S61, the application server 15, when it accepts an access from the terminal 6-2, has metadata designated from the terminal 6-2 read out from the database server 13 in a step S62. The application server 15, in a step S63, generates the message digest of the metadata which was read out by the processing of the step S62. An algorithm for generating this message digest is made to be the same algorithm as the algorithm which was executed in the terminal 6-2, by the above-described processing of the step S44 of FIG. 10.

Next, it goes to a step S64, and the application server 15 prepares the electronic signature to the message digest which was generated by the processing of the step S63. That is, the application server 15 prepares the electronic signature by encrypting the message digest with the use of a secret key of its own. As the secret key which is used at this time, it is possible to utilize the secret key which is used by a public key cryptograph series based upon RSA by R. Rivest, A. Shamir, L. Adelman.

In addition, since the metadata of FIG. 7 is described in an XML format, it is also possible to prepare the electronic signature by use of SXL signature as to which standardization is going on at W3C.

Next, it goes to a step S65, and the application server 15 adds the electronic signature which was generated by the processing of the step S64 to the metadata, and transmits to the terminal 6-2.

Figure 12:
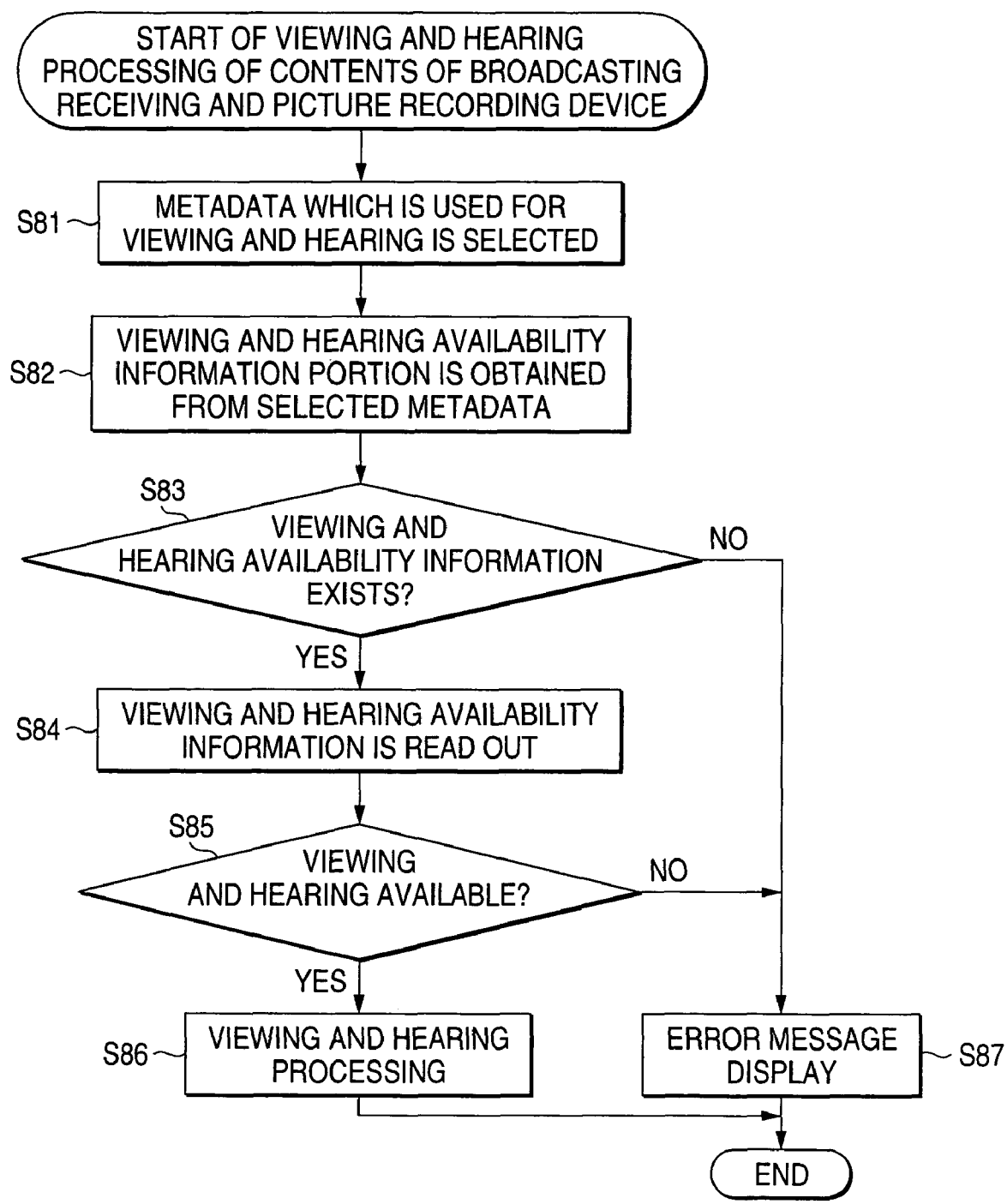
FIG. 12 is a flow chart explaining content viewing processing of the broadcasting receiving and picture recording device of FIG. 1.

A user, upon receiving delivery of the metadata as described above, transfers the metadata which is stored in the storage part 128 of the terminal 6 thereof to the hard disc drive 55 of the broadcasting receiving and picture recording device 5, and can have it stored. And, a user, on the basis of the metadata thereof, can view and hear the broadcasting content which is received and stored in the hard disc drive 55. Next, with reference to the flow chart of FIG. 12, processing in this case will be explained.

A user operates the input part 56, and instructs display of its list, in order to select the metadata which is used for viewing and hearing. The CPU 50, in a step S81, at this time, controls the hard disc drive 55 through the hard disc drive controller 54, and searches the metadata which is stored therein, and generates the data of the list. And, this generated data of the list is supplied to the graphic controller 48, and converted into image data, and outputted through the composer 46 to the monitor 47, and displayed. A user, by operating the input part 56, designates predetermined metadata among the list. The CPU 50, in a step S81, on the basis of an instruction from a user, selectively reads out the metadata which is stored in the hard disc drive 55.

In a step S82, the CPU 50 obtains a viewing and hearing availability information portion from the metadata which was selectively read out. That is, in an example of FIG. 9, a portion of License (a portion from a 3rd line to a 6th line) is obtained here.

In a step S83, the CPU 50 judges whether the viewing and hearing availability information was obtained or not. In case that the metadata shown in FIG. 9, License is described from the 3rd line to the 6th line thereof. That is, the viewing and hearing availability information is registered in the metadata. Accordingly, in this case, it goes to a step S84, and the CPU 50 reads out the viewing and hearing availability information which is described from the 3rd line to the 6th line of the metadata. And, in a step S85, the CPU 50 judges whether the viewing and hearing availability information which was read out can be viewed and heard or not. In case that viewing and hearing are available, it goes to a step S86, and the CPU 50, on the basis of the metadata thereof, reproduces the broadcasting content which is stored in the hard disc drive 55 and has it outputted.

For example, in case of an example of the metadata shown in FIG. 9, the story of "scoring point scene" or "Today's point of interest" which are defined at <Story title> is reproduced, and displayed on the monitor 47. Also, corresponding sound is outputted from the speaker 45.

On one hand, in the step S83, in case that it was judged that the viewing and hearing availability information can not be obtained, or, even if it was obtained, in case that it was judged that viewing and hearing are not available, in the step S85, it goes to a step S87, and the CPU 50 controls the graphic controller 48, and has it generate an error message. And, this error message is outputted through the composer 46 to the monitor 47, and displayed. For example, in case of the example of the metadata shown in FIG. 7, the license information is not added. Accordingly, reproduction of the broadcasting content based upon such metadata is prohibited. Also, if the license information is assumed to be registered, in case that the prohibition of utilization is described, utilization of the broadcasting content is prohibited in the same manner.

By this means, it is prevented the broadcasting content from being illegally utilized.

As described above, when the metadata delivery server 2 delivers the metadata to each terminal 6, the electronic signature is added, and therefore, the public key becomes necessary in order to decrypt this electronic signature, but this public key is obtained in advance by each terminal 6 from the metadata delivery server 2 (of course, other server may be used). Next, processing in this case will be explained with reference to a flow chart of FIG. 13.

In a step S101, the CPU 121 of the terminal 6 controls the communication part 129, and has it access to the metadata delivery server 2. And, the CPU 121 requests for transmission of the public key on the basis of an input of a user from the input part 126.

Figure 14:
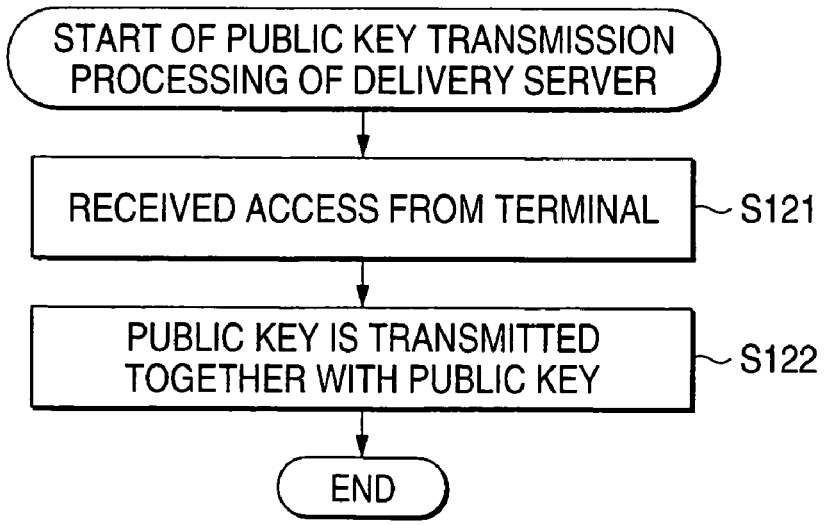
FIG. 14 is a flow chart explaining public key transmitting processing of the metadata delivery server of FIG. 1.

On the basis of this request, the public key is transmitted from the metadata delivery server 2 (step S122 of FIG. 14). The CPU 121, in a step S102, receives the public key which was transmitted from the metadata delivery server 2. To this public key, a certificate is added. A certificate use public key for decrypting this certificate is registered in advance in the ROM 122 of the terminal 6.

Then, in a step S103, the CPU 121 reads out the certificate use public key from the ROM 122, and in a step S104, by use of the certificate use public key, decrypts the certificate which was received in the step S102.

The CPU 121 compares the public key which was obtained by decrypting the certificate with the use of the certificate use public key to the public key which is not decrypted, and if they coincides, supplies this to the storage part 128 as the public key which is not altered, and has it stored. In case that they do not coincide, the public key is not stored as the public key which was altered.

By this, it is possible to obtain the public key for decrypting the electronic signature which is added to the metadata. And, the CPU 121, hereinafter, by use of this public key, as described above, decrypts the electronic signature (step S43 of FIG. 10).

Figure 13:
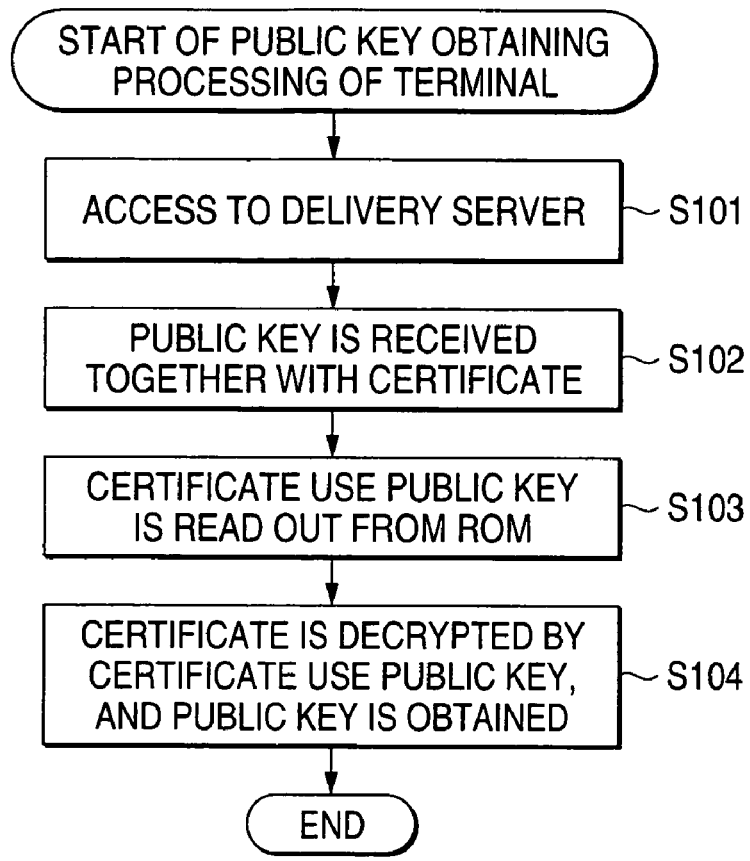
FIG. 13 is a flow chart explaining public key obtaining processing of the terminal of FIG. 1.

FIG. 14 indicates processing of the metadata delivery server 2 which is carried out in response to public key obtaining processing of the terminal 6 of FIG. 13.

In a step S121, the application server 15 is accessed by the terminal 6, and when it receives a request of transmission of the public key, in a step S122, encrypts the public key by the secret key (carries out the electronic signature), and transmits together with the certificate.

In addition, it is possible to encrypt the metadata simply on the basis of a public key cipher system, without adding the electronic signature and deliver it. In this case, the metadata delivery server 2 carries out encryption by the secret key at the time of transmitting the metadata, and the terminal 6 decrypts the metadata by the public key at the time of receiving the metadata.

The above-described series of processing can be carried out by a hardware, but it also can be carried out by a software. In case that a series of the processing is carried out by the software, a program which configures the software is installed from a network or a recording medium into a computer in which a dedicated hardware is incorporated, or for example, a general purpose personal computer which can carry out various functions by installing various programs, and so on.

This recording medium is, as shown in FIG. 4, configured not only by a package media comprising a magnetic disc 141 (including a floppy disc), an optical disc 142 (including CD- ROM (Compact Disk-Read Only Memory), DVD (Digital Versatile Disk)), a magneto-optical disc 143 (including MD (Mini-Disk) (trademark)), or a semiconductor memory 144 etc. which is distributed for providing a program to a user, separately from an apparatus main body and in which the program is recorded, but also by the ROM 122 which is provided to a user in a situation that it was incorporated in advance with the apparatus main body and in which the program is stored, a hard disc which is included in the storage part 128 and so on.

In addition, in this description, the step for describing the program which is recorded in the recording medium includes processing which is carried out along an order described in a chronological manner as a matter of course, and even if it is not necessarily processed in a chronological manner, includes processing which is carried out in parallel or individually.

Also, in this description, the system indicates an entire apparatus which is configured by a plurality of devices.

INDUSTRIAL APPLICABILITY

As described above, according to the first invention, since it is designed that utilization information which relates to utilization of contents is added to reproduction data which was transmitted from a first information processing apparatus and distributed, it becomes possible to realize a system which can realize utilization of contents along with copyrights of broadcasting contents being protected.

According to the second invention, since it is designed that a condition relating to utilization of contents is judged, and on the basis of a judgment result thereof, information which relates to utilization of contents is added to the reproduction data, and outputted, it becomes possible to deliver the reproduction data along with the interests of those who have copyrights of broadcasting contents being protected.

According to the third invention, since it is designed that utilization information contained in the reproduction data obtained is judged, and on the basis of a judgment result thereof, contents are utilized according to the reproduction data, it becomes possible to utilize the contents along with the interests of those who have copyrights of broadcasting contents being protected.

The invention claimed is:

1. An information providing system characterized in that, reproduction data, in which content to be reproduced and an order of reproduction are defined, is transmitted from a first information processing apparatus through a network to a second information processing apparatus, and the second information processing apparatus registers the reproduction data which was sent from the first information processing apparatus and adds utilization information which relates to utilization of the content, registration of the reproduction data being rejected when a zone which should be viewed and heard by all means is not included in the reproduction data, and a third information processing apparatus receives delivery of the reproduction data to which the utilization information was added, from the second information processing apparatus through the network, and on the basis of the reproduction data whose delivery was received, the content can be utilized, the utilization information being determined according to data that cross-references a plurality of contents with respective utilization information, and the utilization information specifying a predetermined portion of the content as a portion which should always be reproduced.

2. An information processing method characterized by including an obtaining step for obtaining reproduction data in which content to be reproduced and an order of reproduction are defined, a specifying step for specifying the content which is defined by the reproduction data obtained by the obtaining step, a judging step for judging a condition which relates to utilization of the content specified by the specifying step, the judging step rendering a judgment that registration of the reproduction data is rejected when a zone which should be viewed and heard by all means is not included in the reproduction data, an adding step for adding utilization information which relates to utilization of the content to the reproduction data, on the basis of a result of judgment by the judging step, and an output step for outputting the reproduction data to which the utilization information was added by the adding step, the utilization information being determined according to data that cross-references a plurality of contents with respective utilization information, and the utilization information specifying a predetermined portion of the content as a portion which should always be reproduced.

3. A non-transitory recording medium which can be read out by a computer and in which a computer-executable program is recorded, the program characterized by including an obtaining step for obtaining reproduction data in which content to be reproduced and an order of reproduction are defined, a specifying step for specifying the content which is defined by the reproduction data obtained by the obtaining step, a judging step for judging a condition which relates to utilization of the content specified by the specifying step, the judging step rendering a judgment that registration of the reproduction data is rejected when a zone which should be viewed and heard by all means is not included in the reproduction data, an adding step for adding utilization information which relates to utilization of the content to the reproduction data, on the basis of a result of judgment by the judging step, and an output step for outputting the reproduction data to which the utilization information was added by the adding step, the utilization information being determined according to data that cross-references a plurality of contents with respective utilization information, and the utilization information specifying a predetermined portion of the content as a portion which should always be reproduced.

4. A non-transitory computer-readable medium storing a computer-readable program for implementing a method in which a computer executes an obtaining step for obtaining reproduction data in which content to be reproduced and an order of reproduction are defined, a specifying step for specifying the content which is defined by the reproduction data obtained by the obtaining step, a judging step for judging a condition which relates to utilization of the content specified by the specifying step, the judging step rendering a judgment that registration of the reproduction data is rejected when a zone which should be viewed and heard by all means is not included in the reproduction data, an adding step for adding utilization information which relates to utilization of the content to the reproduction data, on the basis of a result of judgment by the judging step, and an output step for outputting the reproduction data to which the utilization information was added by the adding step, the utilization information being determined according to data that cross-references a plurality of contents with respective utilization information, and the utilization information specifying a predetermined portion of the content as a portion which should always be reproduced.

5. An information processing method characterized by including an obtaining step for obtaining reproduction data in which content to be reproduced and an order of reproduction are defined, a judging step for judging utilization information which relates to utilization of a corresponding content, which is included in the reproduction data obtained by the obtaining step, the judging step rendering a judgment that registration of the reproduction data is rejected when a zone which should be viewed and heard by all means is not included in the reproduction data, and a utilization step for utilizing the content according to the reproduction data, on the basis of a result of the judgment of the judging step, the utilization information being determined according to data that cross-references a plurality of contents with respective utilization information, and the utilization information specifying a predetermined portion of the content as a portion which should always be reproduced.

6. A non-transitory recording medium which can be read out by a computer and in which a computer-executable program is recorded, the program characterized by including an obtaining step for obtaining reproduction data in which content to be reproduced and an order of reproduction are defined, a judging step for judging utilization information which relates to utilization of a corresponding content, which is included in the reproduction data obtained by the obtaining step, the judging step rendering a judgment that registration of the reproduction data is rejected when a zone which should be viewed and heard by all means is not included in the reproduction data, and a utilization step for utilizing the content according to the reproduction data, on the basis of a result of the judgment of the judging step, the utilization information being determined according to data that cross-references a plurality of contents with respective utilization information, and the utilization information specifying a predetermined portion of the content as a portion which should always be reproduced.

7. A non-transitory computer-readable medium storing a computer-readable program for implementing a method in which a computer executes an obtaining step for obtaining reproduction data in which content to be reproduced and an order of reproduction are defined, a judging step for judging utilization information which relates to utilization of a corresponding content, which is included in the reproduction data obtained by the obtaining step, the judging step rendering a judgment that registration of the reproduction data is rejected when a zone which should be viewed and heard by all means is not included in the reproduction data, and a utilization step for utilizing the content according to the reproduction data, on the basis of a result of the judgment of the judging step, the utilization information being determined according to data that cross-references a plurality of contents with respective utilization information, and the utilization information specifying a predetermined portion of the content as a portion which should always be reproduced.

* * * * *